June 30, 1970    R. McFEE    3,518,537
APPARATUS AND METHOD FOR DETERMINING THE CAPACITANCE AND
CONDUCTANCE OF CAPACITORS
Filed Nov. 28, 1967    4 Sheets-Sheet 1
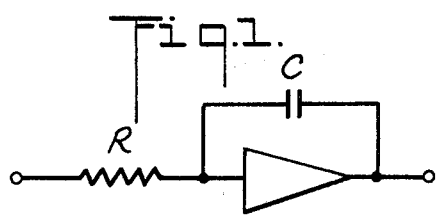
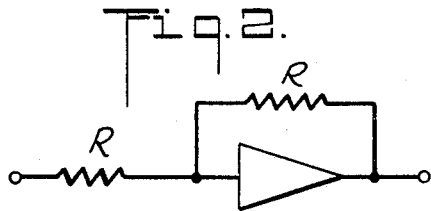
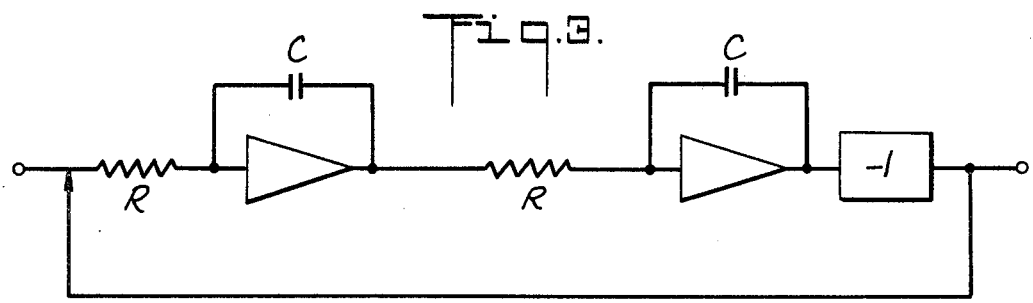
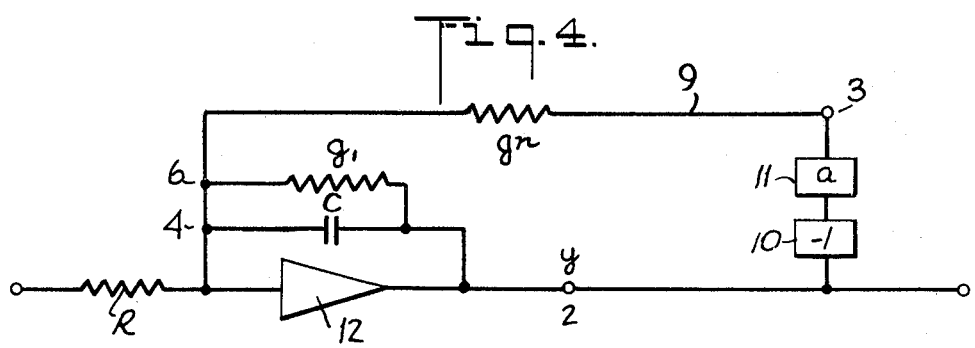
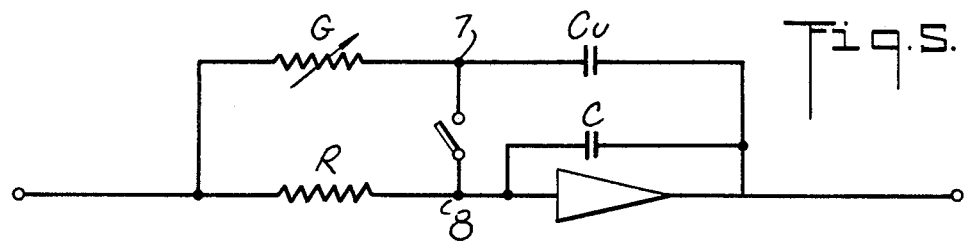
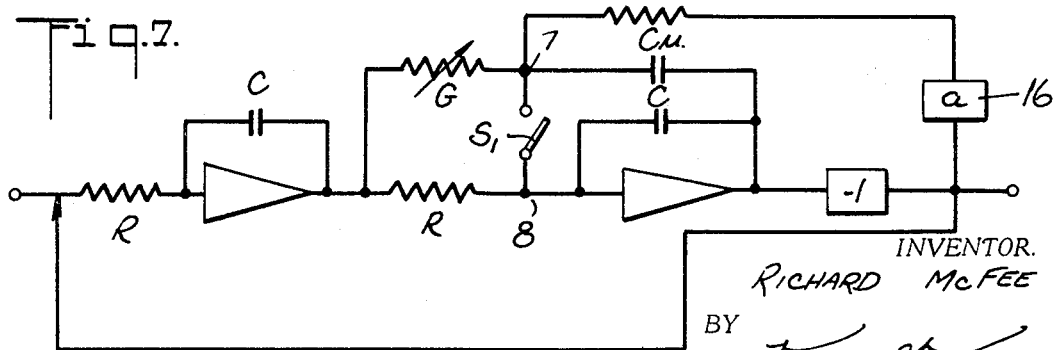
INVENTOR.
RICHARD McFEE
BY
Kenyon & Kenyon
ATTORNEYS INVENTOR.
RICHARD McFEE
BY
ATTORNEYS

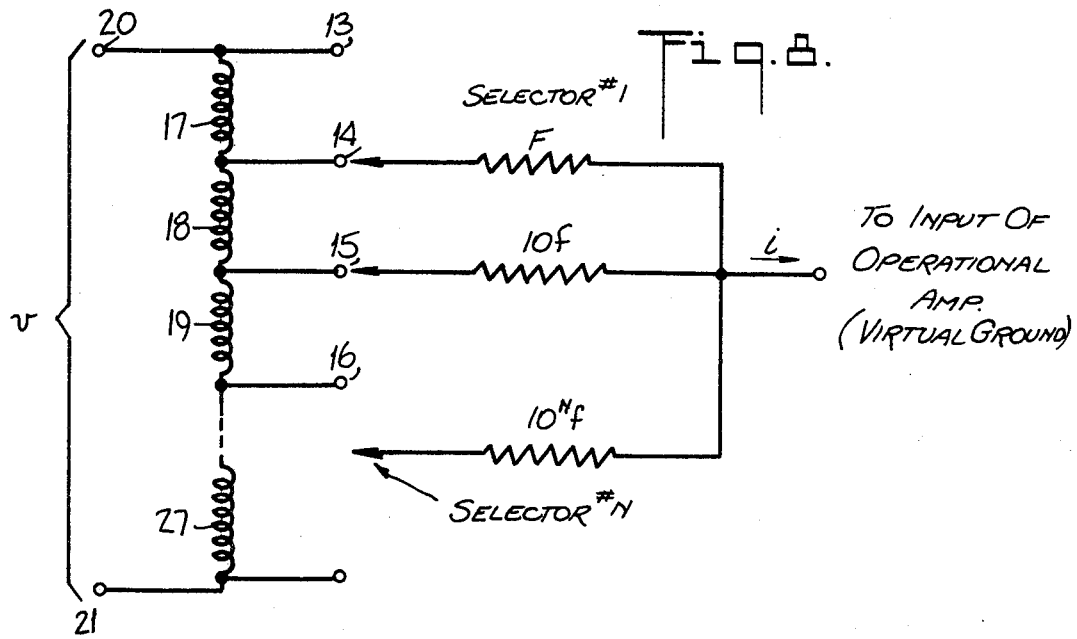
Fig. 8.
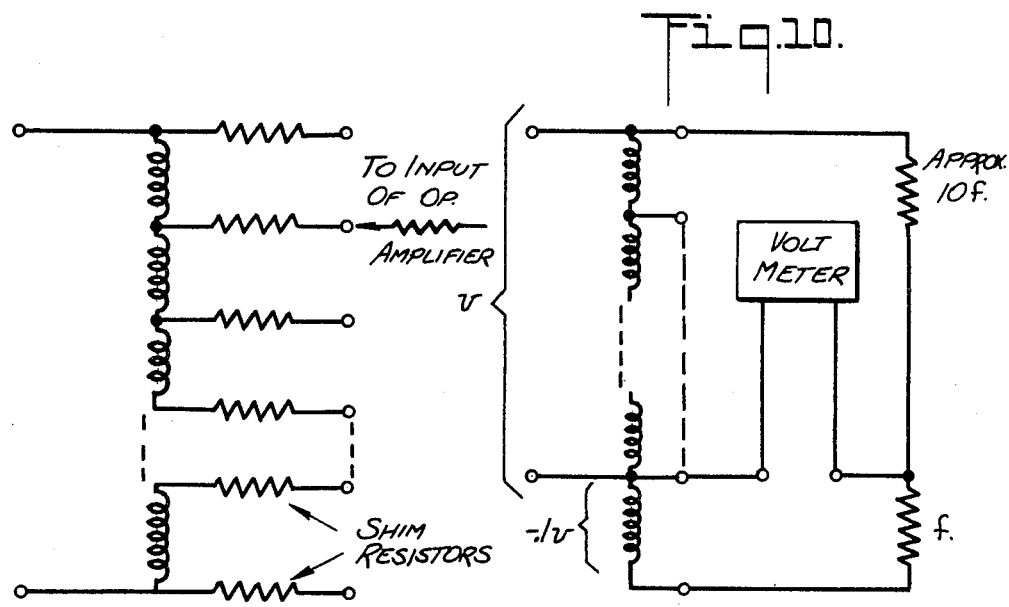
Fig. 9.
Fig. 10.
INVENTOR.
RICHARD McFEE
BY
*Kenyon & Kenyon*
ATTORNEYS

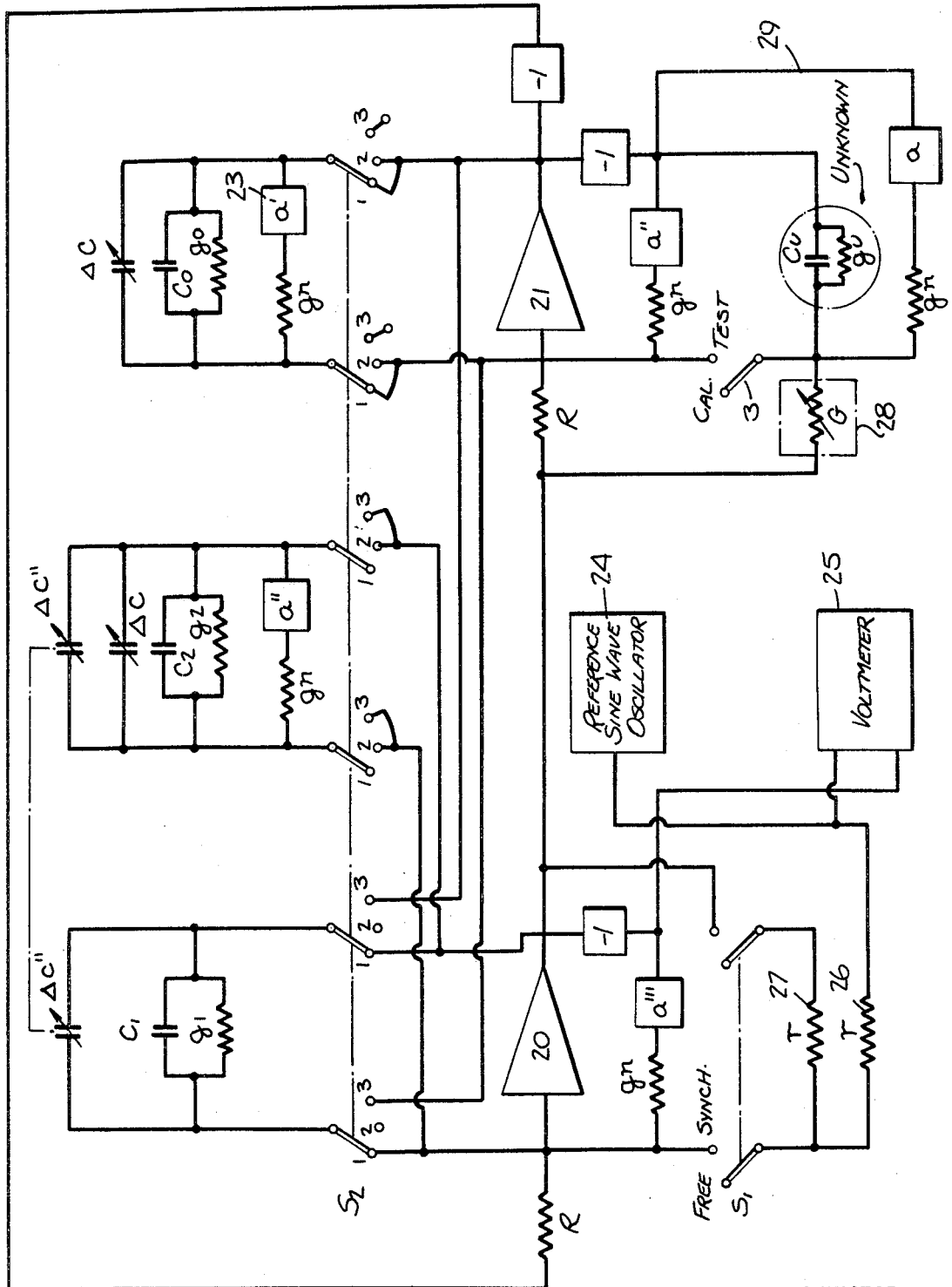

United States Patent Office 3,518,537
Patented June 30, 1970

3,518,537
APPARATUS AND METHOD FOR DETERMINING THE CAPACITANCE AND CONDUCTANCE OF CAPACITORS
Richard McFee, 481 S. Beech St., Syracuse, N.Y. 13210
Filed Nov. 28, 1967, Ser. No. 686,093
Int. Cl. G01r *11/52, 27/26;* H03b *3/04*
U.S. Cl. 324—60                16 Claims

ABSTRACT OF THE DISCLOSURE

A method and the circuitry for determining the capacitance and conductance of an unknown capacitor as a function of known variables is disclosed. Specifically, an oscillator having at least one stage composed of an integrating operational amplifier and a known effectively lossless feedback capacitor, has the unknown capacitor connected in parallel with the feedback capacitor. This changes the frequency and dampens the oscillation of the oscillator. A variable conductance is then connected across the input resistor to retune the oscillator to the predetermined frequency of oscillation. A conductance connected to a variable gain stage is employed to neutralize the losses of the unknown capacitor. This thereby determines the capacitance of the unknown capacitor as a function of the variable conductance and the conductance of the unknown capacitor as a function of the conductance and variable gain of the feedback loop.

A method and the circuitry for obtaining two substantially equal and substantially lossless ideal capacitors is also disclosed. This is obtained by compensating by means of feedback loops for the conductance of the capacitors and by shimming the capacitors until the capacitors are equal to each other.

The above method and circuit may also be used to determine the value of the capacitors, if the neutralizing conductance and shim capacitance are known.

A method and the circuitry for measuring the change in frequency and amplitude of oscillation of the oscillator is also disclosed. This is obtained by connecting a standard oscillator to the oscillator through a resistive network which dampens the differential oscillation and by measuring the voltage across the resistive network. This voltage will be zero when both oscillators are at precisely the same frequency and amplitude of oscillation.

FIELD OF THE INVENTION

The broad field of the invention is the determination of the capacitance and the conductance of capacitors. More particularly the invention relates to the method and the circuitry for determining the capacitance and the conductance of capacitors.

DESCRIPTION OF THE PRIOR ART

In the past, capacitance and conductance of capacitors was determined by a bridge measuring device employing high precision reactance standards which were not only large and expensive but drifted in value with age.

SUMMARY OF THE INVENTION

It is thus an object of the present invention to determine the capacitance and conductance of capacitors by using more stable and compact resistance standards along with frequency standards which can be easily and precisely determined. This thereby allows for greater compactness, accuracy and lower costs in the measuring instrument.

A feature of the invention is the use of an operational amplifier oscillator, employing idealized feedback capacitors, in combination with negative resistance and a variable conductance to determine the capacitance and the conductance of the unknown capacitors.

To determine the capacitance and conductance of the unknown capacitor in accordance with one embodiment of this invention, the unknown capacitor is connected in parallel with the ideal feedback capacitor of one of the two integrating operational amplifier stages of an oscillator having a predetermined frequency and amplitude of oscillation. (The ideal capacitors are capacitors whose conductances have been effectively neutralized and whose capacitances are precisely equal and known.) At the same time, a variable conductance is connected in parallel with the input resistance of that stage, and a variable negative resistance, obtained by means of active circuits, is placed in parallel with the unknown capacitor.

The value of the shunt negative resistance is then adjusted until the amplitude of oscillation of the overall circuit stays constant. The value of the shunt negative resistance is then the negative of the effective shunt resistance of the unknown capacitor.

Next, the value of the variable conductance is adjusted until the oscillator frequency is retuned to the predetermined frequency of the oscillator prior to the addition of the unknown capacitor, the shunt negative resistance, and the variable conductance. At this predetermined frequency of the oscillator, the ratio of the capacitance of the unknown capacitor to the variable conductance will be equal to the known ratio of the ideal capacitor to the input conductance of the amplifier stage. The unknown capacitance, $C_U$, is thus specified by the known values of input conductance or resistance, variable conductance and ideal capacitance, i.e. $C_U = GR_0C_0$ where $C_U$ represents the value of the unknown capacitor, G represents the variable conductance, $R_0$ represents the input resistance, and $C_0$ represents the ideal capacitance.

From the above discussion, it can be seen that the obtaining of ideal capacitors is important to this invention. They are obtained by trimming the capacitance and conductance of two high quality capacitors selected to have nearly equal characteristics. A three-step procedure is followed. First, the capacitors are trimmed to be precisely equal in capacitance and loss at the frequency of interest. This is done by using small trimmer capacitors as well as variable shunt resistors to alter their losses. Then the capacitors are identical, no change in reading occurs when the one is substituted for another in a circuit highly sensitive to changes in capacitor characteristics as, for example, in the circuits of the invention herein described, or in a standard high precision impedance bridge. Second, equal negative resistances are shunted across the capacitors. Equal amounts of loss are subtracted from both capacitors by the negative resistance circuits. This negative loss is adjusted until the circuit oscillates at constant amplitude, with the conductance losses of the capacitors neutralized. Third, the oscillation frequency is measured or equal amounts of trim capacitance are added to or subtracted from both capacitors until the circuit oscillates at the desired frequency. This entire three step procedure may be repeated several times to obtain extremely high accuracy. By this procedure means are provided for eliminating the conductance of the capacitors and idealized capacitors having substantially zero internal conductance and equal known capacitance can be fabricated.

Furthermore, the capacitance and conductance of each of the two uncompensated capacitors will be that of the equal, lossless capacitance, less the trim capacitance and negative resistance added to each. This represents a second circuit and method for determining capacitance.

From the above description it is clear that the measurement of the change in frequency and the amplitude of oscillation of the oscillator is also important. To carry out this measurement means may be provided for synchronizing the oscillation with that of a reference oscillator. To do this, the circuit is connected to the reference oscillator by a resistor network which would dampen the oscillation of the double integrator circuit if the voltage of the reference oscillator were reduced to zero. When the reference oscillator voltage is not zero, however, analysis shows that the double integrator circuit, after an initial transient, will oscillate at constant amplitude at the frequency of the reference oscillator. Voltage differences across the resistor networks coupling the two circuits together will reflect the difference in the natural frequency of the double integrator and the reference oscillator, as well as the extent to which the damping of the double integrator circuit differs from zero.

After the osciilator has been adjusted so that the oscillations of the two circuits are closely synchronized, the resistive coupling between the reference oscillator and the double integrator oscillator can be deleted while the voltage difference which reflects the unbalance continues to be measured. A small residual error in frequency or damping will yield a phase or an amplitude difference which increases linearly with time. Such an increase will signal the presence of the unbalance and the deviation of the oscillator from the predetermined amplitude and frequency of oscillation.

BRIEF DESCRIPTION OF THE DRAWINGS

The above-mentioned and other features and objects of this invention will become more apparent by reference to the follwing description taken in conjunction with the accompanying drawings, in which:

FIG. 1 is a schematic circuit diagram of an integrator or integrating operational amplifier;

FIG. 2 is a schematic circuit diagram of a buffer operational amplifier in which, when the resistors are equal, the output voltage is the negative of the input voltage;

FIG. 3 is a schematic circuit diagram of a well known oscillator of the kind and type useful in this invention, employing two cascaded integrators of FIG. 1;

FIG. 4 is a schematic circuit diagram of a negative resistance circuit coupled to an integrator of FIG. 1 in which the conductance, $g_1$, of the integrator feedback capacitor, C, is represented;

FIG. 5 is a schematic circuit diagram of a switch bridge circuit coupled to an integrator of FIG. 1;

FIG. 7 is a schematic circuit diagram of an embodiment of this invention for determining the capacitance and conductance of an unknown capacitor, in which the feedback capacitor of each operational amplifier is represented as an idealized capacitor having zero effective conductance;

FIGS. 8, 9 and 10 are schematic circuit diagrams of circuits for obtaining variable conductances for use in this invention; and FIG. 11 is a schematic circuit diagram of a meter employing the preferred embodiment of this invention for determining the capacitance and the conductance of an unknown capacitor.

DESCRIPTION OF THE PREFERRED EMBODIMENT

Figure 6A:
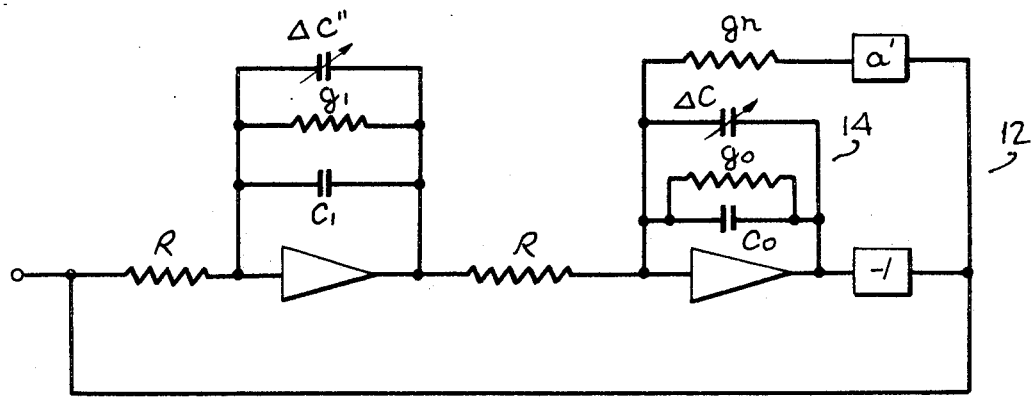
FIGS. 6(A), (B), and (C) are schematic circuit diagrams of the method for fabricating idealized capacitors having precisely equal capacitance and zero effective conductance, and utilizing the oscillator of FIG. 3.

The preferred embodiment of the invention may be illustrated by referring to the drawings for further details.

In the following it is assumed that the operational amplifiers have infinite gain, infinite input impedance and zero source impedance. Since gains, input impedances and effective source impedances of the order of $10^6$, $10^7$ ohms and $10^{-3}$ ohms respectively are readily obtainable, this is a reasonable assumption.

FIG. 1 represents a schematic circuit diagram of an idealized, well known, integrating operational amplifier. It is idealized in that every capacitor is known to have an inherent electrical resistance at a given frequency. This resistance can be represented by a conductance $g$ not shown in FIG. 1 or 3 but represented in FIG. 4 as $g_1$.

FIG. 3 represents a schematic circuit diagram of an idealized, well known, oscillator formed by cascading two operational amplifiers of FIG. 1 with the buffer amplifier of FIG. 2. If the capacitors, C, of FIG. 3 are exactly equal and have no resistance, mathematical analysis shows that this idealized circuit will oscillate sinusoidally at constant amplitude and frequency ($1/2\pi RC$). However as mentioned above, in reality the capacitors C will have a small conductance $g_1$, represented in FIG. 4. The effect of this conductance, $g_1$, is to cause the amplitude of oscillation of the circuit of FIG. 3 to decrease. To compensate for this conductance, $g_1$, the circuit illustrated in FIG. 4 is utilized. In FIG. 4, the feedback loop 9 between points 2 and 4 contains a buffer amplifier 10, similar to FIG. 2, having a gain of $-1$, followed by an attenuator 11, having a gain of $a$, and a conductance $g_n$ connected from the output of the attenuator to the summing point 4 of the amplifier 12. By the proper selection of the gain $a$ of the attenuator 11, in the feedback loop 9 between points 2 and 4, an equal and opposite current is introduced into the summing point 4, of the operational amplifier 12 to that fed back through the conductance $g_1$ of the capacitor. This can be seen from the fact that if the output of the operational amplifier at point 2 is equal to $y$ volts, the voltage at point 3 in the circuit is $-ay$. The current fed back at summing point 4 through conductance $g_n$ equals $-ayg_n$, assuming that the voltage at the summing point is negligible, which will be so if the operational amplifier gain is very high.

If the current flow between points 6 and 4 of FIG. 4 is equal to zero, $g_1y$ (the current fed back through the conductance of the capacitor C) $+ (-ayg_n)$ equals zero. Further, when the current flow between points 6 and 4 equals zero, we have compensated for the conductance $g_1$ and its losses. The amplitude of an oscillator using such a capacitor will neither build up nor decay. Thus if we adjust the gain $a$ of amplifier 11 in FIG. 4 so that the oscillation of an oscillator employing two cascaded operational amplifiers neither builds up nor decays, then the current flow between points 6 and 4 of FIG. 4 will equal zero and $g_1 = ag_n$. Therefore, by the proper selection of the amplifier gain $a$ we may compensate for and eliminate the conductance $g_1$ of the capacitor.

By compensating for the conductance losses of the capacitor in the manner and with the means described above, an ideal oscilator can be fabricated as in FIG. 3 where the capacitors C, having had their conductances compensated for by a feedback loop similar to the feedback loop 9 of FIG. 5, are presumed to have no conductance. Further, as described below this concept of compensating of the conductance can be used to determine the conductance of an unknown capacitor.

To do the above, however, the oscillator of FIG. 3 must be built having equal, known, lossless capacitors. This circuit can be fabricated by the following procedure.

Figure 6B:
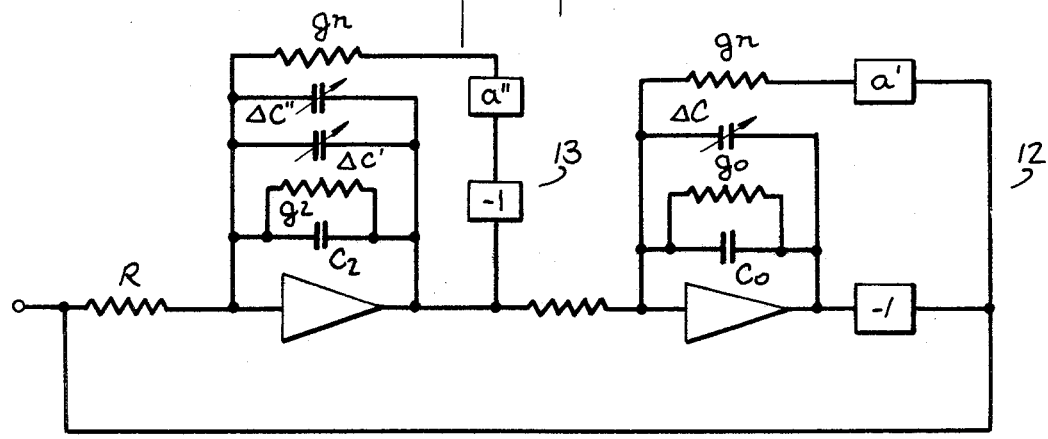

In the circuit of FIG. 6A, the capacitors $C_0$ and $C_2$ (shown in FIG. 6(B)) are selected to be nearly equal to the capacitance $C_1$ but to have slightly less capacitance and greater conductance. The ganged and equal shunt capacitance $\Delta C''$ are initially set to the middle of their range.

In the feedback circuit 12 of FIG. 6(A), including variable attenuator $a'$ and conductance $g_n$, and the feedback circuit 14 including the variable shim capacitor $\Delta C$, $a'$ and $\Delta C$ are varied until a predetermined frequency and constant amplitude of oscilation is obtained.

After this has been achieved, the capacitor $C_1$ with its conductance $g_1$, and shim capacitor $\Delta C''$, are replaced (FIG. 6(B)) by the capacitor $C_2$ with $g_2$, $\Delta C'$, and the ganged capacitance $\Delta C''$. By also incorporating a feedback 13 and by proper adjustment of both the gain $a''$ and the shim capacitor $\Delta C'$, the predetermined frequency and amplitude of oscillation can be reobtained. When this is done, $C_2$ shunted by its shim capacitors $\Delta C''$ and $\Delta C'$ will equal $C_1$ shunted by its shim capacitor $\Delta C''$. Similarly, the shunt conductance $g_2$ as reduced by negative conductance $-a''g_n$ will equal $g_1$.

Figure 6C:
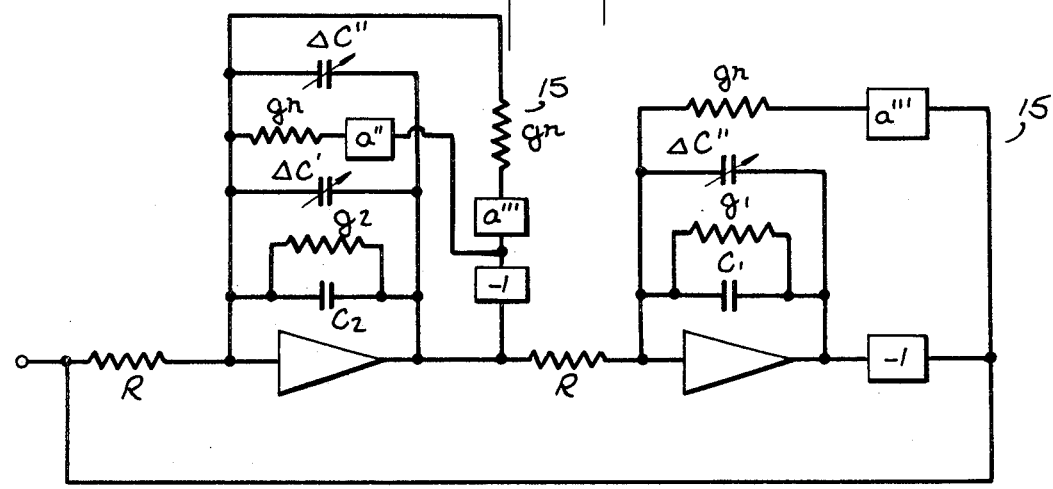

The next step is to replace the capacitor $C_0$ including $g_0$ and $\Delta C$ by $C_1$ with $g_1$ and $\Delta C''$ as illustrated in FIG. 6(C). Ganged feedback loops 15 are added in FIG. 6(C) to both $C_2$ and $C_1$ and the gain $a'''$ and ganged capacitances $\Delta C''$ are adjusted to reobtain the predetermined frequency and the predetermined constant amplitude of oscillation. In this manner, both the capacitors now have been made equal and have effectively zero loss. In addition, the capacitors are tuned by varying $\Delta C''$ jointly in both capacitors $C_1$ and $C_2$ to obtain the precise frequency $f$ so that RC must be $\frac{1}{2} \pi f$, FIG. 6(C) in thus equivalent to the circuit of FIG. 3 in that both capacitors are precisely equal and their resistance losses have been effectively compensated for.

When this is done, the capacitance and conductance of the two capacitors will be given by:

$$C_1 = (1/2\pi Rf) - \Delta C''$$
$$g_1 = a'''g_n$$
$$C_2 = (1/2\pi Rf) - \Delta C' = \Delta C''$$
$$g_2 = (a'' + a''')g_n$$

Having thereby fabricated the ideal oscillator of FIG. 3 by the above method and with the above means, it may be modified and used in accordance with this invention to determine the capacitance of an unknown capacitor via the circuit illustrated in FIG. 5.

In the circuit of FIG. 5 only one of the operational amplifiers of the oscillator of FIG. 3 is shown. In accordance with my invention, the unknown capacitor $C_U$ is connected in parallel with the capacitor C and a variable conductance G is placed in parallel with the input resistance of the operational amplifier. As illustrated in FIG. 5, it can be seen that the two capacitors in parallel, and the resistance and conductance in parallel represent a bridge. If this bridge is balanced so that no current flows between points 7 and 8 of FIG. 5, when switch, $S_1$, is closed, the circuit will act as if $C_U$ were not present.

This can be seen by the fact that with the addition of the unknown capacitance and the new conductance G, the current flowing into the input terminal 8 of the operational amplifier will be precisely as before, if and only if there is no current flowing between points 7 and 8. Thus, with no current flow flowing between points 7 and 8, the input current to the oscillator will be through the input resistance R and feedback capacitor C. In this state the circuit will act as if unknown capacitor $C_U$ were not present and it will oscillate at the same frequency as previously. Thus, by varying the conductance G the predetermined easily measured frequency of oscillation is returned. Since the frequency of the oscillation is given as $1/2\pi RC$ and the bridge is now balanced when the predetermined amplitude and frequency is returned, the value of $C_U$ would then be a function of G, R, and C according to the following equation:

$$\frac{G}{C_U} = \frac{\left(\frac{1}{R}\right)}{C}$$

thus, $C_U = GRC$

Knowing the value of G, C and R, we then know the capacitance of the unknown capacitor $C_u$.

Further, if we know the frequency, we can determine what RC is. Knowing RC to determine the unknown capacitance $C_u$, we merely have to know what G is. Since resistances and frequency can be selected very precisely, we can determine the value of $C_u$ to a high degree of precision. Note that this is done without the use of capacitance standards.

Having determined the capacitance of the unknown capacitor by the above method and with the means described above, its conductance may be determined in accordance with the procedure outlined previously for negatizing the conductances of a capacitor. As shown in FIG. 4 a feedback loop 9, comprised of a buffer amplifier 10, followed by an attenuator 11 having a gain of $a$, and a conductance $g_n$ connected from the output of the attenuator to the summing point 4 of the amplifier 12, is connected between points 2 and 4, in parallel with operational amplifier 12. By the proper selection of the gain $a$ of the amplifier 11 in the feedback loop between points 2 and 4 an equal and opposite current to that fed back through the conductance $g_1$ of the capacitor is introduced into the summing point 4, of the operation amplifier. Further, as pointed out previously, when this feedback current is equal and opposite to that fed back through the conductance $g_1$, or in the case of the unknown capacitor $g_u$, the current flow between points 6 and 4 in FIG. 4 will equal zero, the frequency of the oscillator will neither build up nor decay, and the conductance, $g_u$ in the case of the unknown capacitor, will be equal to $ag_n$.

In general, then, by my invention I have provided a means for connecting an unknown capacitor to an oscillator having a predetermined frequency and amplitude of oscillation, a means and restoring the oscillator to the predetermined frequency and amplitude of oscillation to thereby compensate for the capacitance and conductance of the conductance and determine the capacitance and conductance as a function of the retuning and restoring means.

The concept of negatizing the resistance of a capacitor and compensating for its capacitance can thus be utilized in accordance with this invention in a measuring device of high accuracy.

A simplified version of such a device is illustrated and represented by the schematic of FIG. 7, which is basically the ideal oscillator of FIG. 3 with the equal, lossless capacitors formed in accordance with the procedures of FIGS. 6(A), (B) and (C). If the unknown capacitor $C_u$ is placed in parallel with C in one of the operational amplifiers as shown in FIG. 7 and if a known variable conductance G is placed in parallel with the input resistance R and the original amplitude and frequency of oscillation is reobtained by adjusting G and $a$ of amplifier 16, the current flow between points 7 and 8 will then be zero and closing switch $S_1$ will have no effect. Then the capacitance $C_u$ can be determined by the equation $C_u = GRC$. Knowing precisely what the frequency of the circuit is as represented by $1/2\pi RC$ the value of the unknown capacitance then becomes simply a matter of determing what G is. Likewise, the conductance $g_u$ of the unknown capacitor is determined by the equation $g_u = ag_n$.

A typical known circuit used to obtain precise calibrated conductances is that shown in FIG. 8, where the coils 17, 18, 19 and 27 represent the secondary windings of a transformer having voltage $v$, between terminals 20 and 21. As the resistances $f$, $10f$, and $10^N f$ are connected to the input terminal of the amplifier which is a virtual ground, the total current flowing into this terminal from the transformer will be the voltage of each of the N selector contacts divided by the value of the associated resistor. Assuming that the voltage $(s/10)v$ of each of the transformer taps is proportional to the terminal number $s$ we obtain as an equation for the current $i$ $$i = \frac{S_1}{10f}v + \frac{S_2}{100f}v + \cdots + \frac{S_N}{10^N f}v$$

This is the same current as would be obtained by connecting a conductance of value $$G = \left(\frac{S_1}{10} + \frac{S_2}{100} + \cdots + \frac{S_N}{10^N}\right)\left(\frac{1}{f}\right)$$

between the input terminal of the transformer and that of the operational amplifier.

It is desirable that the transformer used here be of the toroidal type which by virtue of its geometry has no leakage flux. Thus the same flux threads, all turns and the induced voltage in each will be equal. Unbalances may be produced in the equality of the voltages between adjacent taps by the currents flowing out of the transformer into the resistances $f$, $10f$, etc., which cause voltage drops in the resistance of the windings. These can be reduced by employing heavy wire in the transformer winding and, if necessary, using separate transformers for the low resistance ($f$ and $10f$) selector circuits. If each of the contacts of the separate transformers is "shimmed" as shown in FIG. 9, so that the resistance looking back into the transformer remains constant, regardless of the position of the selector contact, then the current will be a linear function of selector position.

It is clear from the preceding equation for the current $i$ entering via the $f$, $10f$, $100f$, resistors, that the values of these resistors must be accurate for the value of the equivalent G to be accurate. That the resistors bear the proper ratio of 10 to 1 to one another may be tested using the transformer in the circuit shown in FIG. 10. If the two resistors, $f$ and $10f$, have a ratio of exactly 10 to 1 the output voltage will be precisely zero. If they do not, one resistor can be shimmed using a small adjustable resistor in series with it so that they do. In this manner all of the resistors except one can be made to bear a prescribed 10:1 ratio with the others. The one resistor to which everything is referred can be of a high precision type.

A possibly more precise variable conductance can be obtained using a single resistor in combination with a tapped transformer arrangement similar to the well known Kelvin-Varley precision attenuator.

A complete operating meter constructed in accordance with this invention is shown in the schematic circuit of FIG. 11 where two idealized capacitors having negatized conductance losses and equal capacitance are utilized as the feedback capacitors for the operational amplifiers. The fabrication of these capacitors is in the manner outlined above with respect to FIGS. 3 and 6($A$), ($B$) and ($C$). Here, in FIG. 11, the two integrating operational amplifiers, 20 and 21, have capacitors $C_1$, $C_2$ and $C_0$ connected as their feedback capacitors by means of the switch $S_2$. When this switch is in position 1, capacitor $C_1$, is connected as the feedback capacitor for operational amplifier 20; capacitor $C_2$ is disconnected from the circuit and capacitor $C_0$ is connected as the feedback capacitor for operation amplifier 21. In this position by adjustment of $a'$ and $\Delta C$, the reactance and resistance losses of capacitor $C_0$ are adjusted so that the circuit oscillates with constant amplitude at the desired frequency.

When $S_2$ is placed in position 2, $C_1$ is disconnected from the circuit, $C_2$ is connected as the feedback capacitor for operational amplifier 20 and $C_0$ is left connected as the feedback capacitor for operational amplifier 21. Here by adjusting $a'$ and $\Delta C'$ to regain constant amplitude of oscillation at the desired frequency, $C_2$ is made equal to C. This procedure may be repeated until $C_2$ is made precisely equal to C.

Next, $S_2$ is placed in position 3 where $C_1$ and $C_2$ are connected as the feedback capacitors for operational amplifiers 20 and 21 while C is disconnected from the circuit. Then the ganged capacitors $\Delta C''$ and the ganged attenuators $a''$, are adjusted to obtain once again constant amplitude of oscillation at the right frequency.

The determination of the frequency and amplitude of oscillation is made by means of the sine wave oscillator of high stability and low distortion 24, voltmeter 25, and resistances 26 and 27. The oscillator 24 is used as a reference standard. When the switch $S_1$ is connected to the "SYNCH" position the double integrator oscillator is forced to oscillate at the same frequency. Furthermore, if the double integrator oscillator, when running "free," is adjusted to oscillate without damping at the same frequency as the reference oscillator 24, then when it is coupled to the reference sine wave oscillator via resistors 26 and 27, the voltage measured by voltmeter 25 will equal zero. If there exists any differences in the free running frequency of the double integrator oscillator and that of the reference oscillator 24 or if the amplitude of oscillation in the double integrator is damped, i.e. the amplitude is decaying due to the presence of the conductance in the capacitors, a steady-state sine wave difference vlotage will be developed whose amplitude is proportional to these differences. When this occurs the circuit frequency and damping are adjusted until no voltage difference is found.

Next the switch $S_1$, is set to "free" and the difference voltage is again measured. Now the double integrator is oscillating freely and any differences in frequency will reveal themselves as cumulating phase shifts. Damping will show itself as a cumulating difference in amplitude. Thus, this measurement yields an indication proportional to the integral of the error. If the differences are given a little time to cumulate, the measurement is much more sensitive than that made in the first step and the first measurement may be considered a coarse measurement while the second is a fine measurement.

After these preliminary adjustments, the circuit of FIG. 11 is now ready to be operated and unknown capacitor $C_u$ is connected in parallel with the feedback capacitor of the second operational amplifier by switching $S_3$ to the "test" position. With proper adjustment, no change in frequency or amplitude will result. A variable conductance, 28 is provided to be paralleled with the input resistance R and a feedback loop, 29, is connected from the output of the operational amplifier to the input of the operational amplifier. By varying the conductance 28 and the gain of the attenuator $a$ in feedback loop 29 the capacitance and the conductance can be directly measured by calibrating the dials. Thus in this manner, a practical capacitance and capacitor conductance meter can be built.

What is claimed is:

1. A circuit for determining the capacitance and conductance of two of three capacitors, having substantially equal capacitance and conductance, said circuit comprising:

a double integrator oscillator having an operational amplifier for each stage, an input resistor for each stage, the first capacitor of three capacitors connected as the feedback capacitor for one stage and the second capacitor of the three capacitors connected as the feedback capacitor for the other stage;

means connected to each of said stages for selectively disconnecting one of the capacitors and connecting another of the capacitors thereto;

means connected to said circuit for measuring the changes in the frequency and amplitude of oscillation of the oscillator;

means connected to said circuit for equating the capacitance and the conductance of the first and third capacitors, whereby the first capacitor may be disconnected from said circuit and the third capacitor connected into place without any change in frequency;

means connected to said circuit for adding or subtracting equal known amounts of resistance from both the equalized first and third capacitors whereby the amplitude of oscillation of the oscillator is constant;

means connected to said circuit for adding or substracting equal known amounts of capacitance from both the equalized capacitors whereby oscillation at a specified frequency results, and the capacitance and conductance of the first and third capacitors are a function of the oscillation frequency, the size of the input resistances, and the conductance and the capacitance added to equalize the capacitors and have the oscillator oscillate at a constant amplitude at the frequency selected.

2. A circuit for determining the conductance and capacitance of a capacitor comprising:
an oscillator having a predetermined frequency and amplitude of oscillation;
means for connecting the capacitor to said oscillator to thereby change the frequency and amplitude of oscillation of said oscillator;
a first means connected to said oscillator for introducing at least one variable conductance to retune said oscillator to said predetermined frequency of oscillation and thereby provide compensation for the capacitance of the capacitor, the extent of retuning by said first means being a function of the capacitance of the capacitor; and
a second means connected to the oscillator having means for restoring the amplitude of the oscillator signal to a constant amplitude of oscillation and thereby provide compensation for the conductance of the capacitor, the extent of restoring by said restoring means being a function of the conductance of the capacitor.

3. A circuit for determining the conductance and capacitance of the capacitor in accordance with claim 2 in which the oscillator has at least one stage, the capacitor is connected to said one stage, and the first means for retuning the frequency and the second means for restoring the amplitude of oscillation are both connected to the same stage as said capacitor.

4. A circuit for determining the conductance and capacitance of a capacitor in accordance with claim 2 in which the oscillator is a double integrator oscillator having at least one integrator stage comprising an operational amplifier having an input resistance and a feedback capacitor;
the capacitor is connected in parallel with the feedback capacitor of one of the integrators;
the first means for retuning the frequency comprises an adjustable conductance connected in parallel with the input resistance of the integrator; and
the second means for restoring the amplitude comprises a feedback loop connected from the output of the integrator to the output of the input resistor of the integrator, a conductance, an inverting amplifier and an attenuator, the gain and conductance of the loop selected to compensate for the current fed back through the internal conductance of said capacitor; whereby the unknown internal conductance is determined as a function of the gain and conductance of the feedback loop and the capacitance is determined as a function of the variable conductance, the input resistance and the feedback capacitor of the integrator.

5. A circuit for determining the conductance and capacitance of a capacitor in accordance with claim 4 in which the double integrator oscillator has idealized feedback capacitors having substantially zero internal conductance and substantially equal capacitance.

6. A circuit for determining the conductance and capacitance of a capacitor in accordance with claim 4, further comprising:
means for eliminating the conductance of feedback capacitors and equating the feedback capacitors to each other, to produce idealized feedback capacitors having substantially zero internal conductance and substantially equal known capacitance.

7. A circuit for determining the conductance and capacitance of a capacitor in accordance with claim 5, further comprising:
means for measuring the frequency and amplitude of oscillation of the oscillator.

8. A circuit for determining the conductance and capacitance of an unknown capacitor in accordance with claim 7 in which the means for measuring the frequency and amplitude of oscillation comprises a standard oscillator coupled to the integrator through a resistive network in which the voltage across the resistive network is a function of the difference between the frequency of the standard oscillator and the natural frequency of oscillation of the oscillator, and of the damping of the oscillator.

9. A method of determining the conductance and capacitance of a capacitor comprising the steps of:
connecting said capacitor to an oscillator having a predetermined frequency and amplitude of oscillation, said connection thereby changing the frequency and amplitude of oscillation of the oscillator;
connecting a variable conductance for retuning the frequency of oscillation to said predetermined frequency of oscillation;
connecting a means for restoring the amplitude of the oscillator signal to a constant amplitude of oscillation;
retuning the oscillator to said predetermined frequency of oscillation by varying the conductance and thereby providing compensation for the capacitance of the capacitor, the extent of retuning being a function of the capacitance of the capacitor;
restoring the amplitude of the oscillator signal to a constant amplitude by varying the restoring means and thereby providing compensation for the conductance of the capacitor, the extent of restoring being a function of the conductance of the capacitor.

10. A method of determining the conductance and capacitance of the capacitor in accordance with claim 9 in which:
the one stage of an oscillator having at least one stage and to which the capacitor is connected is retuned to the predetermined frequency and amplitude of oscillation.

11. A method of determining the conductance and capacitance of a capacitor comprising the steps of:
connection of said capacitor in parallel with a feedback capacitor of one of the integrators of a double integrator oscillator having at least one stage with an input resistance and a feedback capacitor;
retuning the frequency of the oscillator by tuning an adjustable conductance connected in parallel with the input resistance of the integrator the extent of retuning being a function of the capacitance of the capacitor;
restoring the amplitude of the oscillator signal to a constant amplitude by varying the gain and conductance of a feedback loop comprising a conductance, an inverting amplifier and an attenuator, connected from the output of the integrator to the output of the input resistance of the integrator, said changes in the gain and conductance compensating for the current fed back through the internal conductance of the capacitor, the extent of said variation being a function of the conductance of the capacitor.

12. A method of determining the conductance and capacitance of a capacitor in accordance with claim 11, further comprising the step of:
connecting idealized capacitors having substantially zero internal conductance and substantially equal capacitance as the feedback capacitors of the double integrator oscillator.

13. A method of determining the conductance and capacitance of a capacitor in accordance with claim 11, further comprising the steps of:
fabricating idealized feedback capacitors having substantially zero internal conductance and substantially equal capacitance by eliminating the conductance of the feedback capacitors and equating the feedback capacitors to each other.

14. A method of determining the conductance and capacitance of a capacitor in accordance with claim 12 further comprising the step of:
  measuring the frequency and amplitude of oscillation of the oscillator.

15. A method of determining the conductance and capacitance of a capacitor in accordance with claim 12 further comprising the step of:
  coupling a standard oscillator through a resistive network to the integrator; and
  measuring the voltage across the resistive network whereby the difference in the amplitude and frequency of oscillation of the oscillator and the standard oscillator is a function of the voltage across the resistive network.

16. A method of determining the conductance and capacitance of a capacitor in accordance with claim 12 in which the step of fabricating idealized feedback capacitors comprises the steps of:
  (a) connecting a first and a second capacitor as the feedback capacitors of a double integrator oscillator;
  (b) shunting negative resistances across the said first capacitor;
  (c) adjusting the negative resistance until the oscillator oscillates at a constant amplitude;
  (d) replacing the first capacitor by a third capacitor as the feedback capacitor of the stage of the double integrator oscillator;
  (e) shunting negative resistance across said third capacitor;
  (f) adjusting the negative resistance until the oscillator oscillates at a constant amplitude;
  (g) adjusting a trim capacitor connected in parallel with said third capacitor to obtain the prior frequency of oscillation in step (d) and thereby equate said third capacitor and trim capacitor to said first capacitor;
  (h) replacing the second capacitor by the first capacitor with its negative resistance;
  (i) shunting additional equal negative resistance across the first and third capacitors until the oscillator oscillates at constant amplitude;
    whereby the first and second capacitors are made to have substantially zero internal conductance and substantially equal capacitance.

References Cited

UNITED STATES PATENTS

| | | | |
|---|---|---|---|
| 1,971,310 | 8/1934 | Barber | 324—57 |
| 3,049,666 | 8/1962 | Anderson | 324—57 |

EDWARD E. KUBASIEWICZ, Primary Examiner

U.S. Cl. X.R.

331—17

UNITED STATES PATENT OFFICE
CERTIFICATE OF CORRECTION

Patent No. 3,518,537  Dated June 30, 1970

Inventor(s) Richard McFee

It is certified that error appears in the above-identified patent and that said Letters Patent are hereby corrected as shown below:

Col. 3, line 31 - "follwing" should be --following--.

Col. 4, line 57 - "of the conductance" should be --for the conductance--.

Col. 4, line 66 - "capacitance" should be --capacitances--.

Col. 5, line 2 - after "feedback" and before "13" insert the word --loop--.

Col. 5, line 12 - "gain a"'" should be --gains a"'--.

Col. 5, line 19 - "in thus" should be --is thus--.

Col. 5, line 28 - "= $\Delta$ C"'" should be -- -$\Delta$ C"--.

Col. 5, line 58 - "returned" should be --retuned--.

Col. 5, line 59 - "1/2 $\pi$ RC should be -- $\frac{1}{2 \pi RC}$ --.

Col. 5, line 61 - "returned" should be --retuned--.

Col. 6, line 28 - before "and restoring" and after "means" insert the words --for retuning--.

Col. 6, line 51 - "1/2 $\pi$ RC" should be -- $\frac{1}{2 \pi RC}$ --.

Col. 6, line 53 - "determing" should be --determining--.

Col. 7, line 31 - "referred" should be --referenced--.

Col. 7, line 67 - "a","" should be --a"'--.

Col. 8, line 12 - "vlotage" should be --voltage--.

Signed and sealed this 8th day of December 1970.

(SEAL)
Attest:

Edward M. Fletcher, Jr.
Attesting Officer

WILLIAM E. SCHUYLER, JR.
Commissioner of Patents